United States Patent [19]
Aasted

[11] Patent Number: 5,862,745
[45] Date of Patent: Jan. 26, 1999

[54] APPARATUS FOR THE CONTINUOUS TEMPERING OF CACAO BUTTER CONTAINING MASS

[75] Inventor: Lars Aasted, Charlottenlund, Denmark

[73] Assignee: Aasted-Mikroverk ApS, Farum, Denmark

[21] Appl. No.: 912,008

[22] Filed: Aug. 15, 1997

[30] Foreign Application Priority Data

Apr. 17, 1997 [DK] Denmark .................................. 0430/97

[51] Int. Cl.⁶ .............................. A23G 1/00; A23G 1/10; B01F 7/16; B23Q 15/00
[52] U.S. Cl. ................................. 99/470; 99/348; 99/453; 99/455; 99/483; 99/485
[58] Field of Search .............................. 99/348, 452–455, 99/458, 459, 460, 464, 466, 470, 483, 485, 486, 352–355; 366/144, 147; 425/292, 262; 426/138, 231, 519, 524, 660; 165/94, 95, 109.1

[56] References Cited

U.S. PATENT DOCUMENTS

| | | | |
|---|---|---|---|
| 4,998,464 | 3/1991 | Kubacki | 99/455 |
| 5,514,390 | 5/1996 | Aasted | 426/231 |
| 5,525,364 | 6/1996 | Haslund | 99/348 X |
| 5,635,230 | 6/1997 | Aasted | 425/262 X |
| 5,705,217 | 1/1998 | Aasted | 425/292 X |

*Primary Examiner*—Timothy F. Simone
*Attorney, Agent, or Firm*—Finnegan, Henderson, Farabow, Garrett & Dunner, L.L.P.

[57] ABSTRACT

An apparatus (1) for continuous tempering of cacao-butter-containing or other fat-containing, chocolate-like mass flowing therethrough. In the apparatus (1) a predetermined, controlled cooling- or heating-stage of the mass is provided. The apparatus (1) comprises a cooling zone (2) with a plurality of cooling surfaces (3), and a subsequent heating zone (4) with a plurality of heating surfaces (5) for the mass during its passage through at least two sections ($C_1$–$C_n$; $H_1$–$H_n$). The sections comprises mass treatment chambers (6) in succession with associated cooling- or heating medium chambers (7,8). According the invention there is in relation to said sections ($C_1$–$C_n$; $H_1$–$H_n$) of mass treatment chambers (6) arranged at least one heat transmission barrier (9). During operation of the apparatus (1) the heat transmission barrier (9) reduces the heat transmission between the sections ($C_1$–$C_n$; $H_1$–$H_n$) in between which it is arranged to an essentially eliminating and almost imperceptible level. A substantially better controlled tempering process is therefore provided inside a specific section ($C_1$–$C_n$; $H_1$–$H_n$).

15 Claims, 2 Drawing Sheets

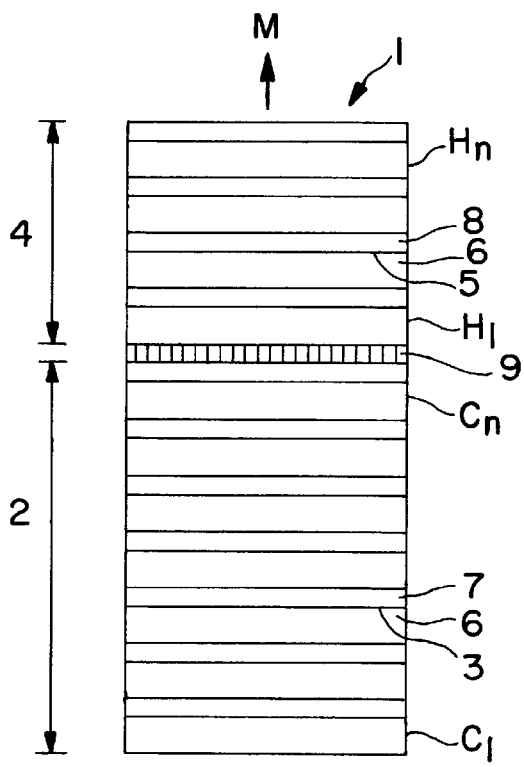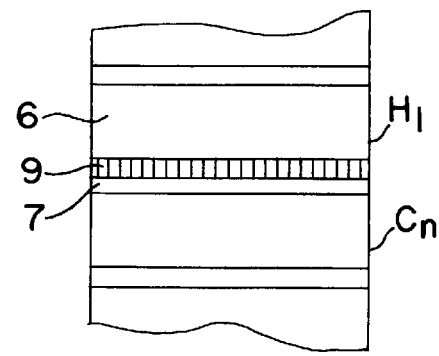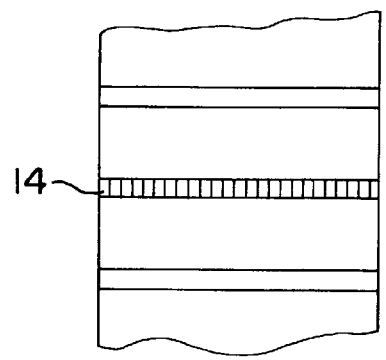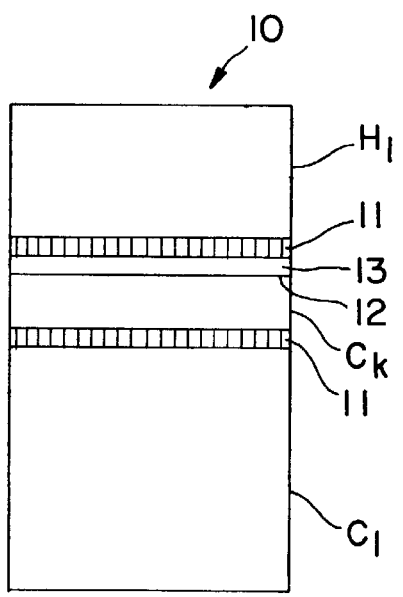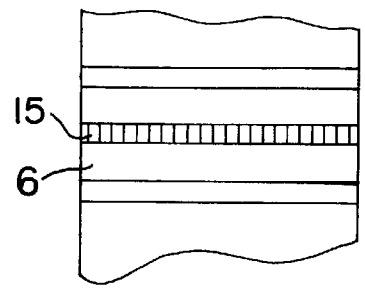

APPARATUS FOR THE CONTINUOUS TEMPERING OF CACAO BUTTER CONTAINING MASS

BACKGROUND OF THE INVENTION

The present invention concerns an apparatus for continuous tempering of cacao-butter-containing or other fat-containing, chocolate-like mass flowing therethrough, wherein a predetermined, controlled cooling or heating stage of the mass is provided in a cooling zone with a plurality of cooling surfaces, and a subsequent heating zone with a plurality of heating surfaces for the mass during its passage through at least two sections of mass treatment chambers in succession with associated cooling or heating medium chambers.

The medium chambers remove heat energy from or add heat energy to the cooling surfaces or the heating surfaces, respectively, by means of a medium, which is controlled to a predetermined temperature and/or a predetermined flow through the medium chambers.

During the flow of mass and its passage through the sections, exchange of heat energy via the cooling surfaces and the heating surfaces, respectively, is conducted, and heat transmission between the medium in a medium chamber and the mass in an adjacent mass treatment chamber is thereby performed.

By the known types of tempering apparatuses, the heat is free to transmit between the particular adjacent sections of mass treatment chambers and the associated cooling or heat medium chambers, with the result that there is a substantial, uncontrolled transmission of heat transmission. It has been difficult to control a tempering process inside a specific section, without considering the influence of the heat transmission between the section in question and the adjacent sections.

Particularly this could be because the heat energy freely flows between a section performing a cooling stage of the mass and an adjacent section performing a heating stage of the mass. This is due to the fact, that the section with the heating stage of the mass has a surplus of heat energy, in comparison to the section with the cooling stage.

A predetermined tempering process in each of the two sections is therefore impossible to control exactly.

Particularly for the crystal formation section of tempering apparatuses it is important to determine and exactly control a predetermined tempering process of the mass, so a high quality of the finally tempered mass is achieved. By the known types of tempering apparatuses it has proven difficult to control the tempering process in the crystal formation section exactly, as the heat flows freely from the medium or the mass chamber of the adjacent sections to the crystal formation section and thereby influences the tempering process in said section.

SUMMARY OF THE INVENTION

The new and characterizing feature of the apparatus for continuous tempering of chocolate-like masses according to the invention is, that in relation to said sections of mass treatment chambers, there is arranged at least one heat transmission barrier.

During operation of the tempering apparatus the heat transmission barrier reduces the heat transmission between the sections in between which it is arranged to an essentially zero or almost to an imperceptible level. A substantially better controlled tempering process is therefore provided inside a specific section, without having to consider the heat transmission between said section and adjacent sections as was necessary before.

The heat transmission between the mass chamber and the medium chamber within a specific section may therefore be predetermined to a far greater extent, as it essentially only depends on the actual heat transmission, which takes place inside the section in question in relation with which the heat transmission barrier is arranged and is not affected by an unpredictable heat transmission from other sections.

It has been found surprising for the person skilled in the art, that by arranging a heat transmission barrier in relation to a section, one is able to control a tempering process without taking into consideration what is performed in the adjacent sections.

According to the invention in a particularly expedient embodiment, the heat transmission barrier may be arranged between a section with cooling surfaces and a section with heating surfaces in the apparatus, which diminishes or essentially eliminates heat transmission between the sections.

The heat transmission barrier may also be arranged between a mass treatment chamber and a medium chamber of an adjacent section, whereby the amount of the heat transmission between the mass in the mass chamber of the section and the medium in the medium chamber of an adjacent section is controlled, and thereby reduced to a minimum. In that way, the mass in the mass treatment chamber is not affected by the temperature of the medium in the medium chamber of the adjacent section, and neither "steals" heat energy from the medium nor in an undesirable manner adds heat energy to the medium.

In another embodiment according to the invention, it has been found expedient, to arrange the heat transmission barrier between a mass treatment chamber and a medium chamber of an adjacent section, where the medium is controlled to have a turbulent flow through the medium chamber. Media with turbulent flow cause a particularly efficient heat transmission, and it is important that a barrier against such an efficient medium chamber be arranged.

The heat transmission barrier may as well be arranged between a mass treatment chamber, wherein the mass flows in one direction, and a medium chamber of an adjacent section, wherein the medium flows in the opposite direction to that of the mass, so that the heat transmission between the two adjacent chambers is controlled and thereby reduced to a minimum.

According to the invention in a particularly expedient embodiment, the heat transmission barrier may be arranged in relation to a section where crystals are formed in the chocolate mass, and where it is particularly important to control the crystal formation exactly, without adjacent sections affecting the tempering process in the section with an unpredictable heat energy.

An expedient and efficient operation of the apparatus is particularly achieved by arranging the heat transmission barrier between a section with cooling surfaces and an adjacent section, in which in the section with cooling surfaces, the cooling water temperature of the associated cooling medium chamber is controlled to a constant level in the interval of 14°–18° C. This embodiment gives a substantial improved control over the heat transmission in a section with cooling surfaces.

According to the invention it has been found expedient and simple to arrange the heat transmission barrier in a medium chamber in the apparatus, which prevents heat transmission between two adjacent mass treatment chambers, thereby making available the opportunity of altering an existent tempering apparatus without substantial construction-wise changes.

By another embodiment according to the invention it has been found expedient, to arrange a heat transmission barrier in a mass treatment chamber. Hereby a division of the mass treatment chamber may be provided, so that the chocolate mass can be exposed to two different tempering stages in the same mass treatment chamber. This embodiment also makes available the opportunity of altering an existent tempering apparatus without substantial construction-wise changes.

An expedient embodiment according to the invention is achieved when the heat transmission barrier is rotably arranged. Then the heat transmission barrier may be an integrated part of a mixing tool of the apparatus. The barrier may divide a mass treatment chamber, so that the mass will be affected by a certain tempering stage at the one side of the barrier and by another stage at the other side of the barrier.

By an expedient embodiment of the heat transmission barrier according to the invention, said heat transmission barrier may comprise a solid material, whereby a barrier is provided that allows a minimum of heat transmission between the sections that the barrier is related to.

By further expedient embodiments the heat transmission barrier may comprise either insulating material or a heat reflective material.

According to the invention in a particularly expedient embodiment, the heat transmission barrier may be arranged so that it extends over mainly the entire surface extension of the adjacent section transversely to the chocolate mass flow through the apparatus, with an open passage for the flow of chocolate mass therethrough, so that the heat transmission, which is present between two adjacent sections will be reduced to the heat being transmitted by the mass.

BRIEF DESCRIPTION OF THE DRAWINGS

The invention will be explained below with reference to particularly preferred embodiments as shown in the drawings, of which FIG. 1 is a schematic lateral view of the construction of a chocolate tempering apparatus, FIG. 2 is an enlarged view of a part of the chocolate tempering apparatus shown in FIG. 1, FIG. 3 is a view of a second embodiment of a construction of a chocolate tempering apparatus, shown in the same way as in FIG. 1 and FIG. 2, FIG. 4 is a view of a third embodiment of a construction of a chocolate tempering apparatus, shown in the same way as in FIGS. 1, 2 and 3, FIG. 5 is a view of a fourth embodiment of a construction of a chocolate tempering apparatus, shown in the same way as in FIGS. 1, 2, 3 and 4.

DETAILED DESCRIPTION OF THE INVENTION

Figure 6:
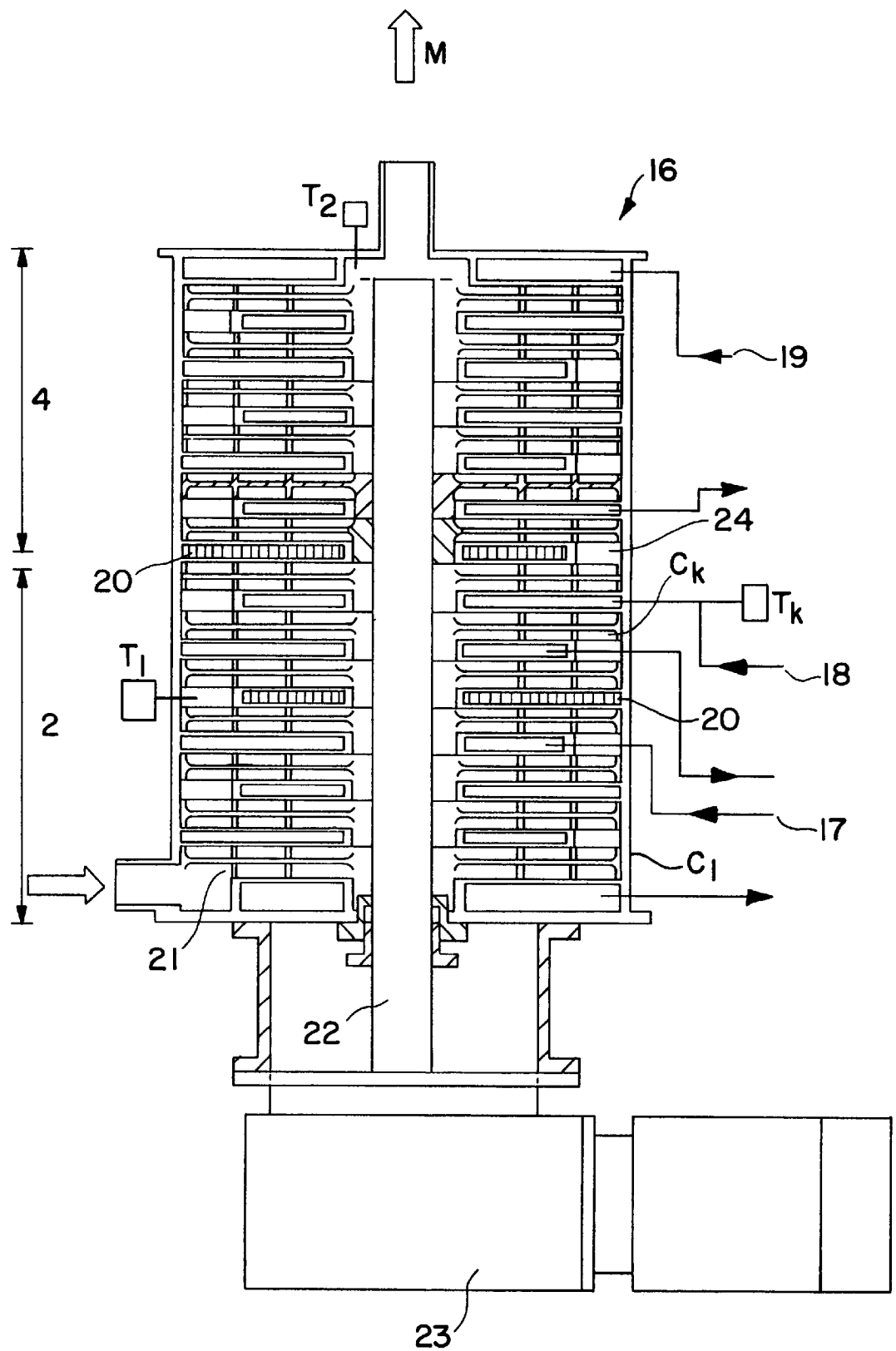
FIG. 6 is a more detailed view of the apparatus shown in FIG. 3, where the insulating barrier is placed directly in the cooling medium chamber.

The apparatus 1 of FIG. 1 is adapted for continuous tempering of cacao-butter—containing or other fat-containing, chocolate-like mass flowing therethrough, and wherein a predetermined, controlled cooling- or heating-stage of the mass is provided. The apparatus comprises a cooling zone 2 comprising a plurality of cooling surfaces 3, and a subsequent heating zone 4 comprising a plurality of heating surfaces 5 for the mass during its passage through at least two sections $C_1-C_n$; $H_1-H_n$, of mass treatment chambers 6 in succession with associated cooling- or heating medium chambers 7, 8.

By the embodiment shown in FIG. 1, the sections $C_1-C_n$, form the cooling zone 2 with a plurality of cooling surfaces 3, and the sections $H_1-H_n$ form a subsequent heating zone 4 with a plurality of heating surfaces 5 for the mass during its passage through the apparatus 1. The flow direction M of the mass is in FIG. 1 shown by arrows.

Between the cooling zone 2 and the heating zone 4 is placed a heat transmission barrier 9, as shown with the embodiment of FIG. 1, which heat transmission barrier is arranged to eliminate the heat transmission between the sections $C_1-C_n$ of the cooling zone 2 and the sections $H_1-H_n$, of the heating zone 4.

In this embodiment the heat transmission barrier 9 is arranged between a section $C_n$ with cooling surfaces 3 and a section $H_1$ with heating surfaces 5. Thereby, heat transmission from the section $H_1$ to the section $C_n$ diminishes, as otherwise there particularly is a high heat transmission between two sections with such strongly diverging temperature conditions.

In the embodiment of FIG. 1, the heat transmission barrier 9 is arranged between a mass treatment chamber 6 and a medium chamber 7 of an adjacent section $C_n$, as more clearly shown in FIG. 2. By this embodiment the heat transmission barrier 9 diminishes the heat transmission between the mass treatment chamber 6 and the medium chamber 7, so that the mass in the mass treatment chamber 6 is not affected by the temperature in the medium chamber 7.

When the medium in the medium chamber 7 is controlled to have a turbulent flow or when the medium is controlled to flow in the opposite direction to that of the mass in the mass treatment chamber 6, the transmission of heat is particularly efficient and can affect the mass. Here, it is particularly important to arrange a heat transmission barrier 9, so that the heat energy does not transmit freely between the efficient medium chamber 7 and the mass treatment chamber 6 of the adjacent section.

The heat transmission barrier 9 may also be arranged elsewhere in the cooling or the heating zone 2, 4.

In FIG. 3 is shown an embodiment of the apparatus 10, which has been found to be expedient, where heat transmission barriers 11 are arranged in relation to a section $C_k$, where crystals are formed. This embodiment allows a substantially improved control over heat transmission in the zone $C_k$, where in particularly the P-crystal formation in the chocolate mass takes place, which is of vital importance to the quality of the finally tempered chocolate mass. It is particularly important to be able to control a predetermined tempering process in the section $C_k$, so that the chocolate mass is not affected by the medium chambers of the adjacent sections $C_1$, $H_1$. Often, the section $C_k$ is arranged in the apparatus 10 between a cooling zone, where the chocolate mass is abruptly cooled via low temperature of the medium in the medium chambers and a heating zone, where the chocolate mass is heated. In such an arrangement the medium chambers of the adjacent sections $C_1$, $H_1$, have substantially diverging temperatures compared to that of the section Ck, so that it is important to arrange heat transmissions barriers 11, which "wrap" the section $C_k$.

In another embodiment of the apparatus 10, the heat transmission barriers 11 are arranged between a section $C_k$ with cooling surfaces 12 and the adjacent sections $C_1$, $H_1$, in which in section $C_k$ the cooling water temperature of the adjacent cooling medium chamber 13 is controlled to a constant level in the interval of 14°–18° C. In this way, the heat energy of the adjacent sections do not influence the section $C_{k1}$ so that the cooling water temperature can be kept in the said interval. The section $C_k$ could for example comprise the crystal formation area.

In the embodiments shown in FIG. 4 and 6, are the heat transmission barriers 14, 20 are arranged directly in a medium chamber. In this way, the existing tempering apparatuses may in a simple manner according to the invention be rebuild, and by it obtain a substantially better controlled tempering process.

In the embodiment of FIG. 5 the heat transmission barrier 15 is arranged in a mass treatment chamber 6. In this way the mass treatment chamber 6 is partitioned, so that the chocolate mass may be exposed to two different tempering stages in the same mass treatment chamber.

In another embodiment the heat transmission barrier can be rotably arranged.

The heat transmission barrier 15 may advantageously be arranged in the form of a mixing tool in the mass treatment chamber, by moulding the heat transmission barrier 15 in the form of a disc, which is provided with means for mixing the chocolate mass and to lead the mass continuously through the apparatus. In this way, it is possible to expose the chocolate mass to a cooling stage on one side of the heat transmission barrier at the same time as the mass on the other side of the barrier is exposed to a heating stage. By having the mass exposed to two different tempering processes in the same mass treatment chamber the apparatus may be made smaller, as a lesser number of cooling surfaces or heating surfaces, respectively, are necessary.

FIG. 6 further shows in more detail a chocolate tempering apparatus 16 with the same construction as the one shown in FIG. 3. The apparatus 16 is a modified tempering apparatus of known type, by which there are connected separate controllable cooling medium circuits 17, 18 to the sections $C_1$, $C_k$ of the cooling zone 2. In relation to the cooling medium circuit 17 there is placed a sensor $T_1$, for measuring the chocolate temperature at the outlet of the section $C_1$. To the heating zone 4 there is related a separately controllable heating medium circuit 19 with a sensor $T_2$ for measuring the chocolate temperature at the outlet of the heating zone 4. A sensor $T_k$ for measuring the water temperature in the cooling medium chamber associated with the section $C_k$ is arranged in the cooling medium circuit 18, where the water temperature is controlled to a constant level in the interval of 14°–18° C. All of the medium circuits 17, 18, 19 are arranged so that the medium flows in the opposite direction to that of the flow direction M of the chocolate mass. In the embodiment of this apparatus 16 there is placed in the medium chambers two heat transmission barriers 20. The heat transmission barriers 20 "wrap" the section $C_k$, so that the heat transmitted from adjacent sections is controlled and reduced to a minimum.

The apparatus shown in FIG. 1–6 belongs to the types of vertical tempering apparatuses, where the chocolate mass M flows in a vertical direction through the apparatus under the influence of mixing tools 21 in each mass treatment chamber, as shown in FIG. 6. The mixing tools 21 are rotated by means of a vertical through shaft 22, which is driven by a motor 23.

The inventive idea could as well apply to other types of tempering apparatuses, such as those being horizontal.

According to the invention the heat transmission barriers 9; 11; 14; 15; 20 may comprise a solid material. A particularly advantageous heat transmission barrier 9; 11; 14; 15; 20 is provided when it is made of an insulating or a heat reflective material.

The heat transmission barrier may also be formed as an evacuated room, or a room with vacuum.

The heat transmission barrier can also be formed as a room or a chamber containing a liquid or a gas. The condition of the liquid or the gases can thereby be controlled to achieve an efficient heat transmission barrier. For example, by controlling the gasses temperature or pressure. An example of a gas is nitrogen.

The heat transmission barrier may also comprise thin layers of heat reflecting materials, such as layers of metal, plastic or painting with a heat reflecting property. It could be a metal foil layer. Layers of precious metal are especially effective.

A heat transmission barrier, which comprises an insulating material placed between layers of heat reflecting materials, such as metal foil, has been found surprisingly effective.

In the shown embodiments, the heat transmission barriers 9; 11; 14; 15; 20 can extend over mainly the entire surface extension of the adjacent section transversely to the chocolate mass flow M through the apparatus, and have only a passage 24 for the flow of chocolate mass therethrough. In this way, the heat transmission, which is present between two adjacent sections is reduced to that of the mass transmitted heat.

In other embodiments according to the invention, the heat transmission barrier can be arranged between two adjacent medium chambers without an intermediary mass treatment chamber.

I claim:

1. In an apparatus for the continuous tempering of a cacao butter containing mass where the mass flows through a series of mass treatment chambers, in succession, first through a cooling zone and subsequently through a heating zone, wherein a predetermined controlled cooling of the mass is provided in the mass treatment chambers in the cooling zone with at least one associated cooling medium chamber adapted to be fed with a cooling medium and having a cooling surface exposed to the mass in the mass treatment chamber and a predetermined controlled heating of the mass is provided in the mass treatment chambers in the heating zone with at least one associated heating medium chamber adapted to be fed with a heating medium and having a heating surface exposed to the mass in the mass treatment chamber, the improvement comprising at least one heat transmission barrier arranged between at least two mass treatment chambers.

2. The apparatus of claim 1, wherein the heat transmission barrier is arranged between a mass treatment chamber exposed to a cooling surface and a mass treatment chamber exposed to a heating surface.

3. The apparatus of claim 1 or 2, wherein the heat transmission barrier is arranged between a mass treatment chamber and an associated medium chamber of an adjacent mass treatment chamber.

4. The apparatus of claim 3, wherein the medium is adapted to flow with turbulent flow through the associated medium chamber.

5. The apparatus of claim 1 or 2, wherein the heat transmission barrier is arranged between a mass treatment chamber, where the mass is adapted to flow in one direction, and an associated medium chamber of an adjacent mass treatment chamber, where the medium is adapted to flow in the opposite direction.

6. The apparatus of claim 1, wherein the heat transmission barrier is arranged adjacent to a mass treatment chamber wherein crystals are formed.

7. The apparatus of claim 1, wherein the heat transmission barrier is arranged between a mass treatment chamber exposed to a cooling surface and an adjacent mass treatment chamber exposed to a heating surface and the temperature of the cooling medium in the associated cooling medium chamber is controlled to a constant level in the interval of 14°–18° C.

8. The apparatus of claim 1, wherein the heat transmission barrier is arranged in a medium chamber.

9. The apparatus of claim 1, wherein the heat transmission barrier is arranged in a mass treatment chamber.

10. The apparatus of claim 1, wherein the heat transmission barrier is rotatably arranged.

11. The apparatus of claim 1, wherein the heat transmission barrier is of a solid material.

12. The apparatus of claim 1, wherein the heat transmission barrier is of an insulating material.

13. The apparatus of claim 1, wherein the heat transmission barrier is of a heat reflective material.

14. The apparatus of claim 1, wherein the heat transmission barrier extends over substantially the entire mass treatment chamber transversely to the flow of mass through the apparatus, and has a passage for the flow of mass therethrough.

15. In an apparatus for the continuous tempering of a cacao butter containing mass where the mass flows through a series of mass treatment chambers, in succession, first through an at least one mass chamber in a cooling zone and subsequently through at least one mass treatment chamber in a heating zone, wherein a predetermined controlled cooling of the mass is provided in the at least one mass treatment chamber in the cooling zone with an associated cooling medium chamber adapted to be fed with a cooling medium and having a cooling surface exposed to the mass in the mass treatment chamber and a predetermined controlled heating of the mass is provided in the at least one mass treatment chamber in the heating zone with an associated heating medium chamber adapted to be fed with a heating medium and having a heating surface exposed to the mass in the mass treatment chamber, the improvement comprising at least one heat transmission barrier arranged in at least one of said two mass treatment chambers.

* * * * *